United States Patent
Sugahara et al.

(10) Patent No.: US 7,254,234 B2
(45) Date of Patent: Aug. 7, 2007

(54) METHOD AND APPARATUS FOR ENCRYPTING AND DECRYPTING INFORMATION

(75) Inventors: Takayuki Sugahara, Yokosuka (JP); Wataru Inoha, Yokosuka (JP); Seiji Higurashi, Fuchu (JP); Toshio Kuroiwa, Yokohama (JP); Kenjiro Ueda, Yokosuka (JP)

(73) Assignee: Victor Company of Japan, Ltd., Yokohama (JP)

(*) Notice: Subject to any disclaimer, the term of this patent is extended or adjusted under 35 U.S.C. 154(b) by 812 days.

(21) Appl. No.: 10/227,460

(22) Filed: Aug. 26, 2002

(65) Prior Publication Data

US 2003/0081773 A1 May 1, 2003

(30) Foreign Application Priority Data

Oct. 22, 2001 (JP) .............................. 2001-323682

(51) Int. Cl.
*H04L 9/00* (2006.01)

(52) U.S. Cl. .......................... 380/37; 380/44; 380/217; 380/239; 380/269; 726/30

(58) Field of Classification Search ................ 715/838, 715/719–726, 730–732, 853–855; 725/37, 725/39, 44; 600/407; 348/77
See application file for complete search history.

(56) References Cited

U.S. PATENT DOCUMENTS

| | | | |
|---|---|---|---|
| 5,058,164 A * | 10/1991 | Elmer et al. ................. 713/190 |
| 5,224,164 A * | 6/1993 | Elsner ......................... 380/44 |
| 5,381,481 A | 1/1995 | Gammie et al. |
| 5,742,686 A * | 4/1998 | Finley ......................... 380/28 |
| 6,011,849 A * | 1/2000 | Orrin .......................... 380/42 |
| 6,064,738 A * | 5/2000 | Fridrich ....................... 380/28 |
| 6,269,163 B1 * | 7/2001 | Rivest et al. ................. 380/28 |
| 6,353,672 B1 * | 3/2002 | Rhoads ....................... 382/100 |
| 6,845,159 B1 * | 1/2005 | Domstedt et al. ............. 380/44 |
| 2001/0014155 A1 | 8/2001 | Sugahara et al. |
| 2002/0073326 A1 * | 6/2002 | Fontijn ....................... 713/190 |

FOREIGN PATENT DOCUMENTS

| | | |
|---|---|---|
| EP | 0751515 A2 | 1/1997 |
| JP | 7-140896 | 6/1995 |
| JP | 10-269289 | 10/1998 |
| JP | 10-283268 | 10/1998 |
| JP | 2001-203683 | 7/2001 |
| JP | 2001-274784 | 10/2001 |
| WO | WO 00/59154 | 10/2000 |

OTHER PUBLICATIONS

Wen, J., et al, 'A format-compliant configurable encryption framework for access control of video', IEEE Transactions, Jun. 2002, vol. 13, No. 6, entire document, http://ieeexplore.ieee.org/iel5/76/21836/01013859.pdf.*

* cited by examiner

*Primary Examiner*—Nasser Moazzami
*Assistant Examiner*—Ronald Baum
(74) *Attorney, Agent, or Firm*—Louis Woo

(57) ABSTRACT

An encryption key is generated in response to a plurality of information pieces being bases for the encryption key. Original information is encrypted into encryption-resultant information in response to the generated encryption key. The encryption-resultant information is divided into units. Each of the units is loaded with encryption control information for identifying the plurality of information pieces being the bases for the encryption key.

2 Claims, 9 Drawing Sheets

FIG. 7

| SYNTAX NAME | BIT NUMBER |
|---|---|
| System ID | 8 |
| Version | 8 |
| Character Set | 4 |
| Num of CNTNT_IFO | 8 |
| Start Adrs of CNTNT_IFO | 32 |

FIG. 8

| SYNTAX NAME | BIT NUMBER |
|---|---|
| End Adrs of PR_IFO | 32 |
| PR number | 8 |
| Playback Time | 32 |
| Num of INDEX | 8 |
| Rec Date | 32 |
| Rec Time | 24 |
| PR text information size | 8 |
| PR text information | N BYTES |
| Content nibble 1 | 8 |
| Content nibble 2 | 8 |
| V_ATR | 32 |
| V_ATR | 32 |

FIG. 9
| SYNTAX NAME | BIT NUMBER |
|---|---|
| End Adrs of INDEX_IFO | 32 |
| INDEX number | 8 |
| Playback Time | 16 |
| Start frame of INDEX | 32 |
| End frame of INDEX | 32 |
FIG. 11
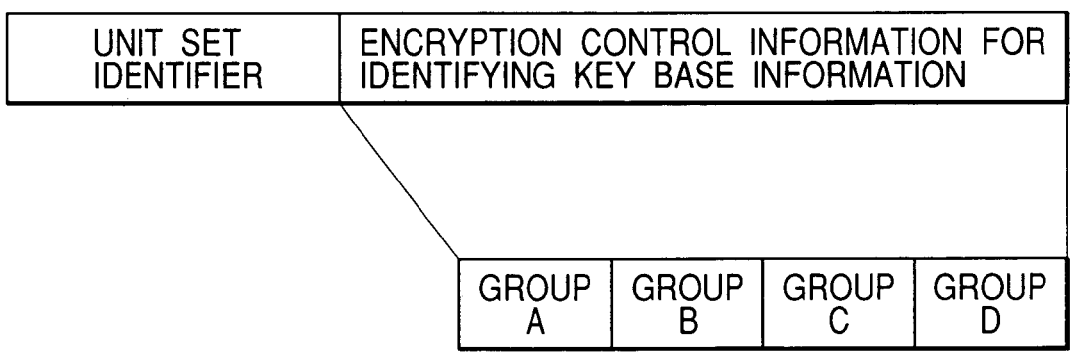
FIG. 12
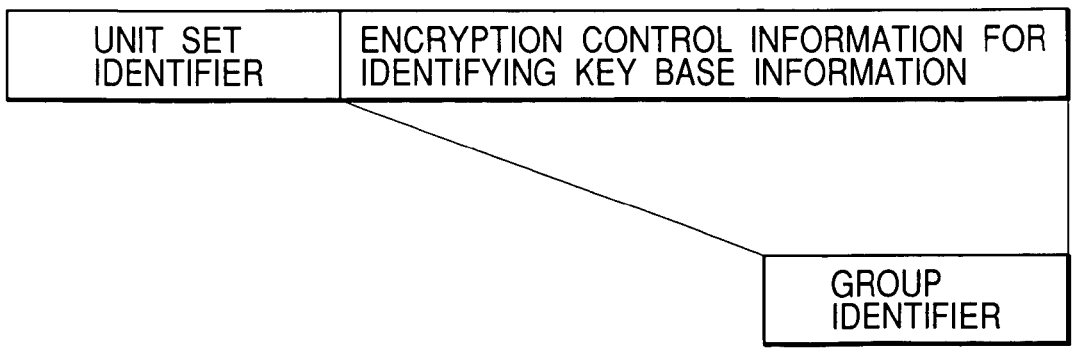

METHOD AND APPARATUS FOR ENCRYPTING AND DECRYPTING INFORMATION

BACKGROUND OF THE INVENTION

1. Field of the Invention

This invention relates to a method of encrypting information, a method of decrypting information, an apparatus for encrypting information, and an apparatus for decrypting information.

Furthermore, this invention relates to an information recording medium.

2. Description of the Related Art

Japanese patent application publication number 10-269289/1998 discloses a system for managing the distribution of digital contents. In the system of Japanese application 10-269289, a distributor side encrypts and compresses digital contents into processing-resultant digital contents. The distributor side transmits the processing-resultant digital contents, an encryption-resultant contents key, and encryption-resultant accounting information to a communication opposite party. The distributor side implements a process of receiving a charge on the basis of contents use information transmitted from the communication opposite party. Then, the distributor side implements a process of dividing the received charge among interested persons including a copyright holder of the digital contents. On the other hand, a user side (a digital contents player) decrypts and expands the processing-resultant digital contents in response to the contents key, thereby reproducing the original digital contents. The user side subjects the accounting information to a reducing process responsive to the use of the digital contents. The user side transmits the reduced accounting information and the contents use information to the distributor side.

In the system of Japanese application 10-269289, a third person can illegally reproduce the original digital contents when getting the original contents key.

Japanese patent application publication number 10-283268/1998 discloses a system in which a recording medium stores encryption-resultant main information, and also encryption-resultant information representing a key for decrypting the encryption-resultant main information. Non-encrypted information representing conditions of decrypting the encryption-resultant main information is added to the encryption-resultant key information. In more detail, the encryption-resultant key information has non-encrypted control information which contains device information and region information. The control information is designed to prevent the encryption-resultant main information from being copied onto a magnetic recording medium or an optical disc in a user side for illegal use thereof.

The system of Japanese application 10-283268 has a problem as follows. The non-encrypted control information in the encryption-resultant key information can easily be altered by a third person. The alteration of the non-encrypted control information enables the third person to illegally copy the encryption-resultant main information.

Japanese patent application publication number 7-140896/1995 discloses first and second systems each for encrypting an ordinary text file. In the first system of Japanese application 7-140896, the ordinary text file is divided into ordinary text blocks each having the smallest limit of a data size range in which data can be transmitted between a disk buffer and an on-memory data area used by an application program. The ordinary text blocks are encrypted into encryption-resultant text blocks in response to a user key. The encryption-resultant text blocks are connected to form an encryption-resultant text file.

In the second system of Japanese application 7-140896, the ordinary text file is divided into ordinary text blocks each having the smallest limit of a data size range in which data can be transmitted between a disk buffer and an on-memory data area used by an application program. Data keys are generated from a user key and values peculiar to the respective ordinary text blocks. The total number of data keys is equal to that of the ordinary text blocks. The values of the offsets of the ordinary text blocks from the head of the ordinary text file are used as the peculiar values, respectively. The ordinary text blocks are encrypted into encryption-resultant text blocks in response to the data keys, respectively. The encryption-resultant text blocks are connected to form an encryption-resultant text file.

The first and second systems of Japanese application 7-140896 tend to be insufficient in security.

SUMMARY OF THE INVENTION

It is a first object of this invention to provide a method of encrypting information which is improved in security.

It is a second object of this invention to provide a method of decrypting information which is improved in security.

It is a third object of this invention to provide an apparatus for encrypting information which is improved in security.

It is a fourth object of this invention to provide an apparatus for decrypting information which is improved in security.

It is a fifth object of this invention to provide an information recording medium improved in security.

A first aspect of this invention provides a method comprising the steps of generating an encryption key in response to a plurality of information pieces being bases for the encryption key; encrypting original information into encryption-resultant information in response to the generated encryption key; dividing the encryption-resultant information into units; and loading each of the units with encryption control information for identifying the plurality of information pieces being the bases for the encryption key.

A second aspect of this invention provides a method comprising the steps of detecting encryption control information in each of units composing encryption-resultant information, the encryption control information being for identifying a plurality of information pieces being bases for an encryption key; identifying the plurality of information pieces being the bases for the encryption key in response to the detected encryption control information; generating the encryption key from the identified plurality of information pieces being the bases for the encryption key; and decrypting each of the units composing the encryption-resultant information into a unit of original information in response to the generated encryption key.

A third aspect of this invention provides an information encrypting apparatus comprising first means for generating an encryption key in response to a plurality of information pieces being bases for the encryption key; second means for encrypting original information into encryption-resultant information in response to the encryption key generated by the first means; third means for dividing the encryption-resultant information generated by the second means into units; and fourth means for loading each of the units with encryption control information for identifying the plurality of information pieces being the bases for the encryption key.

A fourth aspect of this invention provides an information decrypting apparatus comprising first means for detecting encryption control information in each of units composing encryption-resultant information, the encryption control information being for identifying a plurality of information pieces being bases for an encryption key; second means for identifying the plurality of information pieces being the bases for the encryption key in response to the encryption control information detected by the first means; third means for generating the encryption key from the identified plurality of information pieces being the bases for the encryption key; and fourth means decrypting each of the units composing the encryption-resultant information into a unit of original information in response to the encryption key generated by the third means.

A fifth aspect of this invention provides an information recording medium which stores encryption-resultant information divided into units, wherein each of the units contains encryption control information for identifying a plurality of information pieces to generate an encryption key.

A sixth aspect of this invention provides a method comprising the steps of dividing original information into original-information units; generating an encryption key in response to a plurality of information pieces being bases for the encryption key; encrypting each of the original-information units into an encryption-resultant information unit in response to the generated encryption key; and loading the encryption-resultant information unit with encryption control information for identifying the plurality of information pieces being the bases for the encryption key.

A seventh aspect of this invention provides an information encrypting apparatus comprising first means for dividing original information into original-information units; second means for generating an encryption key in response to a plurality of information pieces being bases for the encryption key; third means for encrypting each of the original-information units generated by the first means into an encryption-resultant information unit in response to the encryption key generated by the second means; and fourth means for loading the encryption-resultant information unit generated by the third means with encryption control information for identifying the plurality of information pieces being the bases for the encryption key.

BRIEF DESCRIPTION OF THE DRAWINGS

FIG. 7 is a diagram of the syntax structure of a second-level segment in FIG. 3.

FIG. 8 is a diagram of the syntax structure of a third-level segment in FIG. 3.

FIG. 9 is a diagram of the syntax structure of a fifth-level segment in FIG. 4.

FIG. 11 is a diagram of a unit set identifier, encryption control information, and seed groups in a second embodiment of this invention.

FIG. 12 is a diagram of a unit set identifier, encryption control information, and a seed-group identifier in a third embodiment of this invention.

DETAILED DESCRIPTION OF THE INVENTION

First Embodiment

Figure 1:
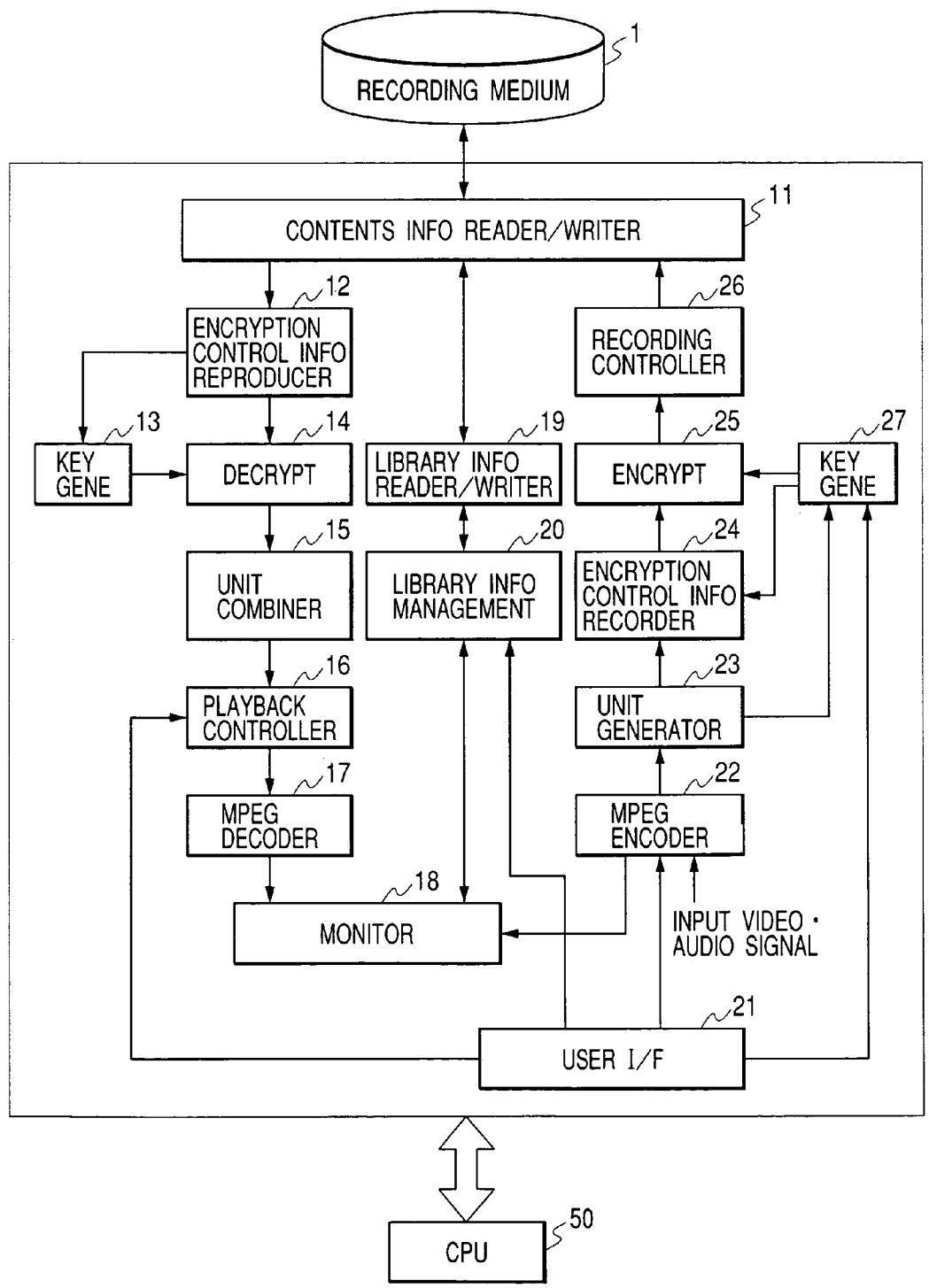
FIG. 1 is a block diagram of an information recording and reproducing apparatus according to a first embodiment of this invention.

FIG. 1 shows an information recording and reproducing apparatus according to a first embodiment of this invention. The apparatus of FIG. 1 includes an MPEG (Motion Picture Experts Group) encoder 22 for converting an input video signal and an input audio signal into a digital signal conforming to the MPEG standards. The input video signal and the input audio signal compose an audio-visual contents signal (an audio-visual program signal). The input video signal and the input audio signal are, for example, analog. The MPEG encoder 22 outputs the MPEG digital signal to a unit generator 23.

The unit generator 23 divides the output signal of the MPEG encoder 22 into units referred to as first digital information units. The unit generator 23 outputs the first digital information units to an encryption control information recorder 24. The encryption control information recorder 24 receives encryption control information from an encryption key generator 27. The encryption control information recorder 24 adds the encryption control information to the first digital information units to generate second digital information units. The encryption control information recorder 24 outputs the second digital information units to an encrypting device 25.

The encrypting device 25 receives a signal representative of an encryption key from the encryption key generator 27. The encrypting device 25 encrypts the second digital information units in response to the encryption key to generate encryption-resultant digital information units. Preferably, the encryption key is varied from second digital information unit to second digital information unit. The encryption key may be updated for every prescribed number of second digital information units. The encrypting device 25 outputs the encryption-resultant digital information units to a recording controller 26. The recording controller 26 implements recording control concerning the encryption-resultant digital information units. The recording controller 26 passes the encryption-resultant digital information units to a main reader/writer 11 as contents information. The main reader/writer 11 writes the contents information on a recording medium 1. The main reader/writer 11 reads out the contents information from the recording medium 1.

The apparatus of FIG. 1 further includes a user interface 21 which can be operated by a user. The user interface 21 generates command signals in accordance with operation by the user. The user interface 21 is connected to the MPEG encoder 22 and the encryption key generator 27.

A library information management device 20 is connected to the user interface 21. The library information management device 20 handles library information having pieces including a piece representing the title of an audio-visual program (contents) to be recorded, and a piece representing the date and time of the start of the recording of the audio-visual program. The library information is also referred to as side information. The library information management device 20 formats and deformats the library information (the side information). The library information management device 20 sends and receives the library information to and from a library information reader/writer 19. The library information reader/writer 19 sends and receives the library information to and from the main reader/writer 11. The library information reader/writer 19 enables the main reader/writer 11 to write the library information on the recording medium 1 and read out the library information therefrom.

In addition, the apparatus of FIG. 1 includes an encryption control information reproducer 12 which receives the read-out contents information from the main reader/writer 11. The encryption control information reproducer 12 extracts encryption control information from the read-out contents information. The encryption control information reproducer 12 outputs the extracted encryption control information to an encryption key generator 13. The encryption control information reproducer 12 passes the read-out contents information to a decrypting device 14. The encryption key generator 13 produces a signal representative of an encryption key in response to the encryption control information. The encryption key generator 13 outputs the signal of the encryption key to the decrypting device 14. Preferably, the encryption key generator 13 is basically similar in structure to the encryption key generator 27. The decrypting device 14 decrypts the read-out contents information into decryption-resultant digital information units in response to the encryption key. The decrypting device 14 outputs the decryption-resultant digital information units to a unit combiner 15.

The unit combiner 15 connects the decryption-resultant digital information units into an original MPEG digital signal. The unit combiner 15 outputs the MPEG digital signal to a playback controller 16. The playback controller 16 implements playback control concerning the MPEG digital signal. The playback controller 16 passes the MPEG digital signal to an MPEG decoder 17. The playback controller 16 is connected with the user interface 21. The MPEG decoder 17 decodes the MPEG digital signal into an original video signal and an original audio signal which are, for example, analog. The MPEG decoder 17 outputs the video signal and the audio signal to a monitor 18. The monitor 18 indicates contents (an audio-visual program) represented by the video signal. The monitor 18 converts the audio signal into corresponding sounds. The monitor 18 is connected with the library information management device 20 and the MPEG encoder 22.

The apparatus of FIG. 1 further includes a CPU 50 connected to the devices 11-27 for controlling them. The CPU 50 can transmit signals among the devices 11-27. The CPU 50 has a combination of an input/output port, a processing section, a ROM, and a RAM. The CPU 50 operates in accordance with a control program stored in the ROM or the RAM. The control program is designed to enable the CPU 50 to implement operation steps mentioned later.

Operation of the apparatus of FIG. 1 can be changed among different modes including a playback mode (a reproducing mode) and a recording mode.

Figure 2:
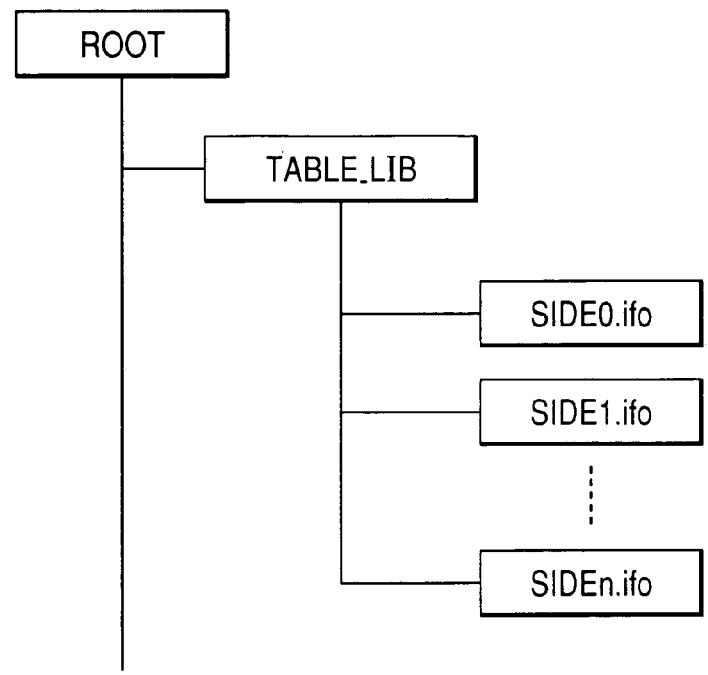
FIG. 2 is a diagram of a file structure used in the case where library information is recorded on a recording medium.
Figure 3:
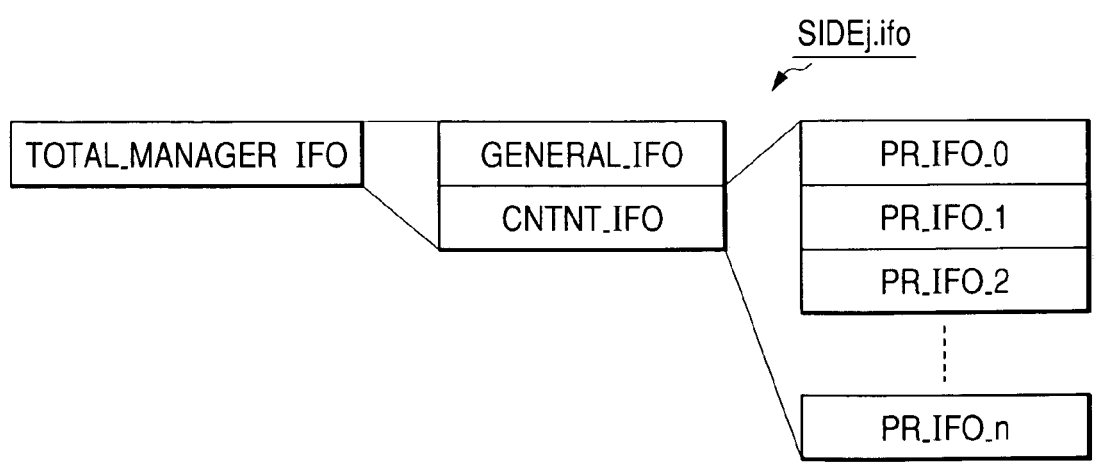
FIG. 3 is a diagram of the structure of a file in FIG. 2.
Figure 4:
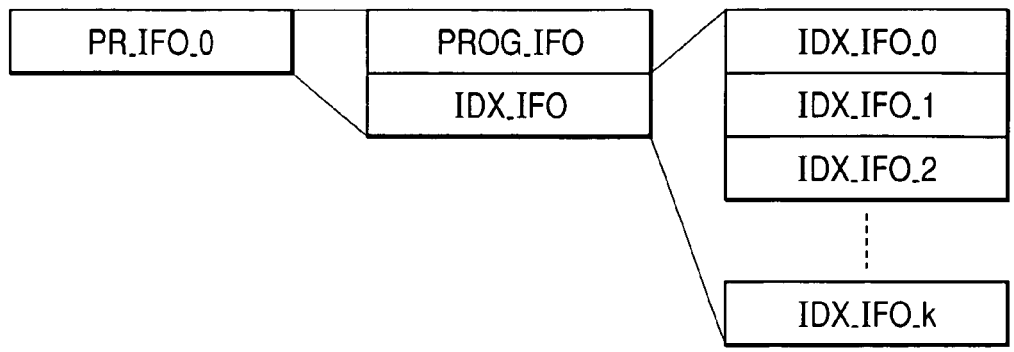
FIG. 4 is a diagram of the structure of a third-level segment in FIG. 3.

The playback mode of operation of the apparatus of FIG. 1 is as follows. When a signal representative of a command to monitor detailed information about audio-visual programs is inputted via the user interface 21, the CPU 50 controls the main reader/writer 11 and the library information reader/writer 19 to read out library information (side information) from a recording medium 1. The library information is structured data indicating explanations and attributes of contents (audio-visual programs). The library information is in a file having a name "SIDE.ifo" (see FIG. 2). The library information is of a structure or a format such as shown in FIGS. 3 and 4. The library information contains information pieces concerning respective audio-visual programs, and information pieces concerning respective indexes being segments resulting from dividing each audio-visual program at prescribed time intervals. These information pieces in the library information have explanations of corresponding contents (corresponding audio-visual programs). Accordingly, the library information is detailed information about audio-visual programs. The read-out library information is transmitted from the main reader/writer 11 to the library information management device 20 via the library information reader/writer 19. The library information management device 20 processes the library information into a video signal of a predetermined program information indication format which represents a program information picture having an area provided with a picture of the library information by layout. The library information management device 20 outputs the video signal to the monitor 18. The monitor 18 indicates the program information picture having the library information which is the detailed information about the audio-visual programs. The program information picture shows designation numbers (identification numbers) assigned to the audio-visual programs respectively.

The user interface 21 is provided with a remote control device having keys and buttons including a playback start button and a recording start button.

The user decides desired one among the audio-visual programs while watching the detailed information thereabout which is indicated on the monitor 18. The user actuates the keys on the remote control device to input a signal representing the designation number assigned to the desired audio-visual program. In addition, the user presses the playback start button. The user interface 21 informs the CPU 50 that the playback start button is pressed. The CPU 50 functions to transmit a playback start signal to the playback controller 16 when being informed that the playback start button is pressed. In addition, the CPU 50 transmits the signal of the designation number assigned to the desired audio-visual program to the playback controller 16. The CPU 50 causes the playback controller 16 to pass the playback start signal to the main reader/writer 11. The playback controller 16 informs the main reader/writer 11 of the designation number assigned to the desired audio-visual program. The playback controller 16 may convert the designation number assigned to the desired audio-visual program into the on-medium address thereof. In this case, the playback controller 16 informs the main reader/writer 11 of the on-medium address of the desired audio-visual program. The main reader/writer 11 reads out contents information, which represents the desired audio-visual program, from the recording medium 1 in response to the playback start signal and the on-medium address of the desired audio-visual program (or the designation number assigned to the desired audio-visual program). The main reader/writer 11 outputs the read-out contents information to the encryption control information reproducer 12.

The encryption control information reproducer 12 detects encryption control information in each of successive units composing the read-out contents information. The encryption control information reproducer 12 may detect a unit set identifier and encryption control information in each of successive units composing the read-out contents information. The unit set identifier will be explained later. The encryption control information reproducer 12 sends the encryption control information (or the unit set identifier and the encryption control information) to the encryption key generator 13. The encryption control information reproducer 12 passes the read-out contents information to the decrypting device 14. The encryption key generator 13 identifies encryption-key base information in response to the encryption control information (or the unit set identifier and the encryption control information). The encryption-key base information means information representing a base for an encryption key. The encryption key generator 13 produces a signal representative of an encryption key in response to the identified encryption-key base information. The encryption key generator 13 outputs the signal of the encryption key to the decrypting device 14. Preferably, the encryption key generator 13 is basically similar in structure to the encryption key generator 27. The decrypting device 14 decrypts each of successive units composing the read-out contents information into a decryption-resultant digital information unit in response to the encryption key. The decrypting device 14 outputs the decryption-resultant digital information unit to the unit combiner 15.

The unit combiner 15 sequentially receives decryption resultant digital information units from the decrypting device 14. The unit combiner 15 connects the decryption-resultant digital information units into an original MPEG digital signal. The unit combiner 15 outputs the MPEG digital signal to the playback controller 16. The playback controller 16 passes the MPEG digital signal to the MPEG decoder 17. The MPEG decoder 17 decodes the MPEG digital signal into an original video signal and an original audio signal. The MPEG decoder 17 outputs the video signal and the audio signal to the monitor 18. The monitor 18 indicates contents (an audio-visual program) represented by the video signal. The monitor 18 converts the audio signal into corresponding sounds. The playback controller 16 implements playback control concerning the MPEG digital signal. Specifically, the playback controller 16 counts frames represented by the MPEG digital signal since the moment of the start of the playback of the present audio-visual program. The playback controller 16 decides whether or not the MPEG digital signal reaches an ending point of the present audio-visual program on the basis of the number of counted frames. When the MPEG digital signal reaches the ending point of the present audio-visual program, the playback controller 16 sends a playback end signal to the main reader/writer 11. The main reader/writer 11 halts the read-out of the contents information from the recording medium 1 in response to the playback end signal.

The recording mode of operation of the apparatus of FIG. 1 is as follows. When the recording start button is pressed so that a signal representative of a command to record an input audio-visual contents signal (an input audio-visual program signal) is inputted via the user interface 21, the CPU 50 transmits a recording start signal to the recording controller 26. The input audio-visual contents signal is, for example, a broadcasted audio-visual contents signal. Information representing the title of an audio-visual program to be recorded is inputted via the user interface 21. The program-title information is transmitted from the user interface 21 to the library information management device 20. The library information management device 20 gets information representing the date and time of the start of the recording of the audio-visual program. The library information management device 20 formats the program-title information and the recording start date information into library information (side information) of a prescribed format which will be explained later. The library information management device 20 sends the library information to the library information reader/writer 19. The CPU 50 controls the main reader/writer 11 and the library information reader/writer 19 to record the library information on a recording medium 1.

Figure 5:
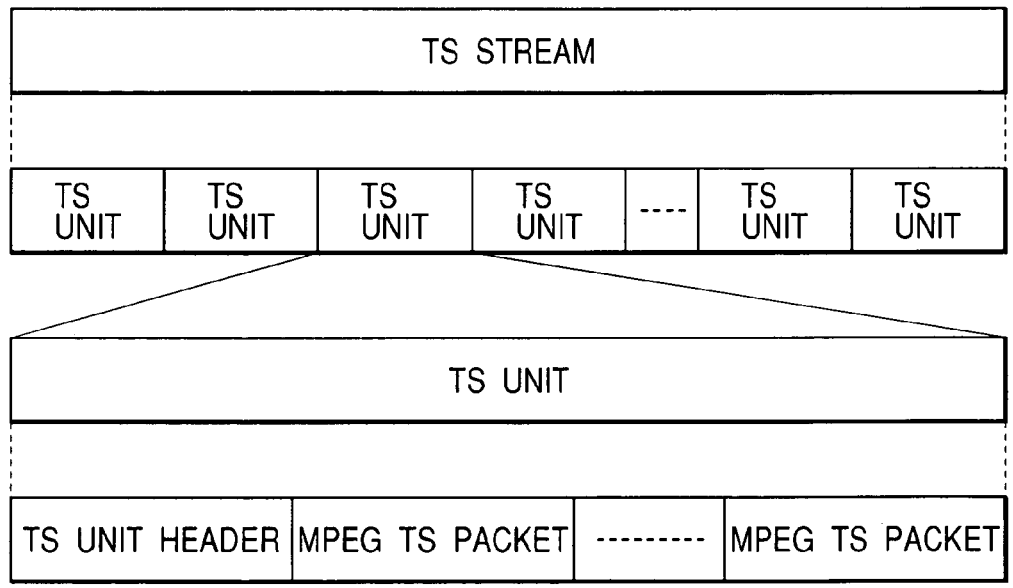
FIG. 5 is a diagram of a data format on a recording medium.
Figure 6:
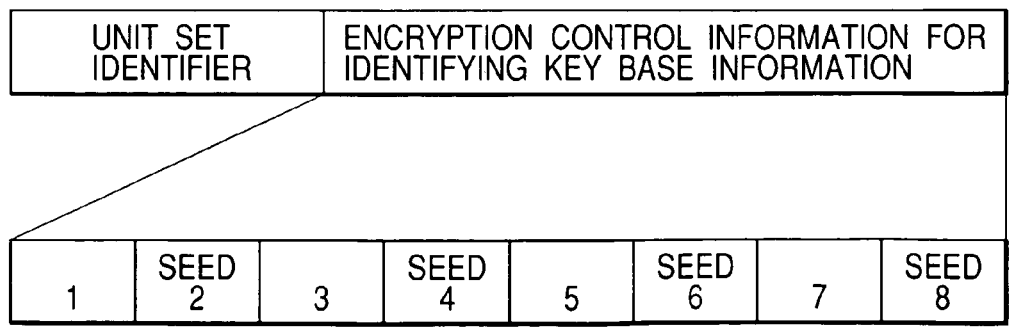
FIG. 6 is a diagram of a unit set identifier, encryption control information, and seeds for an encryption key.

The MPEG encoder 22 receives the input audio-visual contents signal, and encodes the received audio-visual contents signal into a digital signal conforming to the MPEG standards. The MPEG encoder 22 outputs the MPEG digital signal to the unit generator 23. The MPEG digital signal is a transport stream of packets (MPEG transport stream packets). The unit generator 23 divides the output signal of the MPEG encoder 22 into TS (transport steam) units which are sequentially arranged. As shown in FIG. 5, each of the TS units includes a prescribed number of successive MPEG transport stream packets. The unit generator 23 provides a header area in each of the TS units. In each TS unit, the header area precedes a first MPEG transport stream packet. The unit generator 23 outputs the resultant TS units to the encryption control information recorder 24. The unit generator 23 produces a signal representing every timing (every unit timing) which corresponds to the boundary between adjacent TS units. The unit generator 23 outputs the unit-timing signal to the encryption key generator 27. The encryption control information recorder 24 receives encryption control information from the encryption key generator 27. As shown in FIG. 6, the encryption control information is designed to identify encryption-key base information. The encryption control information recorder 24 receives a unit set identifier from the encryption key generator 27. The encryption control information recorder 24 loads each of the header ares of the TS units with the encryption control information and the unit set identifier to get header-added complete TS units. The encryption control information recorder 24 outputs the header-added complete TS units to the encrypting device 25.

The user operates the user interface 21 to set the level of the security of the audio-visual contents (the audio-visual program) to be recorded. The CPU 50 transmits a signal representative of the set security level from the user interface 21 to the encryption key generator 27. The encryption key generator 27 produces encryption control information in response to the security-level signal. Preferably, the encryption key generator 27 updates the encryption control information in response to the unit-timing signal. In this case, the encryption control information is varied from TS unit to TS unit. The encryption control information may be updated for every prescribed number of TS units. The encryption key generator 27 identifies encryption-key base information in response to the encryption control information in a way explained later. The encryption key generator 27 produces a signal representative of an encryption key from the identified encryption-key base information. The encryption key generator 27 outputs the signal of the encryption key to the encrypting device 25. At the same time, the encryption key generator 27 outputs the encryption control information to the encryption control information recorder 24.

The encryption key generator 27 produces the unit set identifier in response to the unit-timing signal. The encryption key generator 27 outputs the produced unit set identifier to the encryption control information recorder 24.

The encrypting device 25 encrypts the complete TS units except their headers in response to the encryption key to generate encryption-resultant TS units. The encrypting device 25 outputs the encryption-resultant TS units to the recording controller 26. The recording controller 26 includes a buffer memory for storing contents data forming the encryption-resultant TS units. Each time the contents data stored in the buffer memory reaches a prescribed amount, the recording controller 26 transfers the contents data from the buffer memory to the main reader/writer 11 while being controlled by the CPU 50. The main reader/writer 11 writes the contents data on the recording medium 1 as encryption-resultant contents information. The encryption-resultant contents information recorded on the recording medium 1 is of a data format or a data structure in FIG. 5.

The format concerning side information (library information) recorded on a recording medium 1 will be explained below. The recording medium 1 has a plurality of members including, for example, magnetic tapes, magnetic disks, or optical disks. The recording medium 1 stores a directory, folders, and files in a hierarchical structure. Specifically, as shown in FIG. 2, the recording medium 1 stores a ROOT directory under which a folder named "TAPE_LIB" is placed. Under the folder "TAPE_LIB", there are a plurality of files named "SIDE0.ifo", "SIDE1.ifo", . . . , and "SIDEn.ifo" respectively. The files "SIDE0.ifo", "SIDE1.ifo", . . . , and "SIDEn.ifo" are loaded with side-information pieces (library-information pieces) which relate to the recording-medium members, respectively. In general cases where each recording-medium member stores a plurality of audio-visual programs, the corresponding file "SIDEj.ifo (j=0, 1, . . . , n)" relates to the plurality of audio-visual programs.

With reference to FIG. 3, each file "SIDEj.ifo (j=0, 1, . . . , n)" is in a format having a hierarchical structure. Specifically, each file "SIDEj.ifo (j=0, 1, . . . , n)" has a first-level segment "TOTAL_MANAGER_IFO" containing second-level segments "GENERAL_IFO" and "CNTNT_IFO". The second-level segment "GENERAL_IFO" is loaded with parameters relating to the whole of the present side-information piece.

The second-level segment "GENERAL_IFO" is of a syntax structure shown in FIG. 7. Specifically, the second-level segment "GENERAL_IFO" is composed of information pieces having syntax names "System ID", "Version", "Character Set", "Num of CNTNT_IFO", and "Start Adrs of CNTNT_IFO", respectively. The information piece "System ID" is an 8-bit identification signal (ID) representing that related information is of the present format. The information piece "Version" is an 8-bit signal representing a version number. The information piece "Character Set" is a 4-bit signal representing a text code by which text information in the related audio-visual programs is expressed. The information piece "Num of CNTNT_IFO" is an 8-bit signal representing the total number of program information pieces "PR_IFO" which will be explained later. The information piece "Start Adrs of CNTNT_IFO" is a 32-bit signal representing the head address of a first program information piece "PR_IFO_0".

The second-level segment "CNTNT_IFO" in FIG. 3 contains third-level segments "PR_IFO_0", "PR_IFO_1", . . . , and "PR_IFO_n" loaded with information pieces which relate to audio-visual programs respectively. Each of the third-level segments "PR_IFO_0", "PR_IFO_1", . . . , and "PR_IFO_n" is of a syntax structure shown in FIG. 8. Specifically, each third-level segment "PR_IFO" is composed of information pieces having syntax names "End Adrs of PR_IFO", "PR number", "Playback Time", "Num of INDEX", "REC Date", "REC Time", "PR text information size", "PR text information", "Content nibble 1", "Content nibble 2", "V_ATR", and "A_ATR", respectively. The information piece "End Adrs of PR_IFO" is a 32-bit signal representing the end address of the present third-level segment "PR_IFO". The information piece "PR number" is an 8-bit signal representing the designation number (the identification number) assigned to the related audio-visual program. The information piece "Playback Time" is a 32-bit signal representing the playback time of the related audio-visual program. The information piece "Num of INDEX" is an 8-bit signal representing the number of indexes into which the related audio-visual program is divided. The indexes correspond to different scenes, respectively. The information piece "Rec Date" is a 32-bit signal representing the date of the recording of the related audio-visual program. The information piece "Rec Time" is a 24-bit signal representing the time of the recording of the related audio-visual program. The information piece "PR text information size" is an 8-bit signal representing the number of bytes composing text information indicative of a brief explanation of the related audio-visual program. The information piece "PR text information" is an N-byte signal being the text information. The information pieces "Content nibble 1" and "Content nibble 2" are 8-bit signals representing the genre of the related audio-visual program. The information piece "V_ATR" is a 32-bit signal representing the compression parameters, the video bit rate, and the video pixel size. The information piece "A_ATR" is a 32-bit signal representing the audio channel number and the audio bit rate.

The third-level segments "PR_IFO_0", "PR_IFO_1" . . . , and "PR_IFO_n" are similar in structure. Only the third-level segment "PR_IFO_0" will be explained in more detail. As shown in FIG. 4, the third-level segment "PR_IFO_0" contains fourth-level segments "PROG_IFO" and "IDX_IFO". The fourth-level segment "IDX_IFO" contains fifth-level segments "IDX_IFO_0", "IDX_IFO_1", . . . , and "IDX_IFO_k" loaded with information pieces which relate to respective indexes of the related audio-visual program. Each of the fifth-level segments "IDX_IFO_0", "IDX_IFO_1", . . . , and "IDX_IFO_k" is of a syntax structure shown in FIG. 9. Specifically, each fifth-level segment "IDX_IFO_j (j=0, 1, . . . , or k)" is composed of information pieces having syntax names "End Adrs of INDEX_IFO", "INDEX number", "Playback Time", "Start frame of INDEX", and "End frame of INDEX", respectively. The information piece "End Adrs of INDEX_IFO" is a 32-bit signal representing the end address of the present fifth-level segment "IDX_IFO_j". The information piece "INDEX number" is an 8-bit signal representing the serial number assigned to the related index. The information piece "Playback Time" is a 16-bit signal representing the playback time of the related index. The information piece "Start frame of INDEX" is a 32-bit signal representing the order number of a start frame in the related index. The information piece "End frame of INDEX" is a 32-bit signal representing the order number of an end frame in the related index.

A detailed description will be given of a method of generating an encryption key and also encryption control information for identifying encryption-key base information. As shown in FIG. 6, the header of each complete TS unit produced by the encryption control information recorder 24 or the encrypting device 25 has a unit set identifier and encryption control information. The encryption control information is designed to identify encryption-key base information (that is, information representing a base for an encryption key). The unit set identifier is composed of a 2-bit segment and a 1-bit segment. The 2-bit segment of the unit set identifier contained in the output signal of the encrypting device 25 indicates whether or not the related TS unit except its header has been encrypted. The 1-bit segment of the unit set identifier indicates whether or not an initial value for an encryption block should be set. The encryption control information has 8 bits. The 8 bits of the encryption control information relate to respective information pieces which can be used as partial bases for an encryption key. Specifically, each of the 8 bits indicates whether or not the related information piece is used as a partial base for an encryption key. In more detail, each of the 8 bits which is "1" indicates that the related information piece is used as a partial base for an encryption key, while each of the 8 bits which is "0" indicates that the related information piece is not used as a partial base for an encryption key.

The information pieces which can be used as partial bases for an encryption key are also referred to as the encryption-key base information pieces. Preferably, the encryption-key base information pieces are selected from 1) an information piece about an audio-visual program designation number or an audio-visual program identification number, 2) an information piece about a region or regions corresponding to one or more countries, one or more zones, or one or more spaces, 3) an information piece about identification of an individual, 4) an information piece about identification of a group of persons, 5) an information piece about a rating, 6) an information piece about identification of an apparatus maker or a device maker, 7) an information piece about identification of a contents provider, 8) an information piece about time, 9) an information piece about contents authoring persons, 10) an information piece about identification of a reproducing apparatus or a reproducing device, 11) an information piece about identification of a connection apparatus or a connection device, 12) an information piece about identification of a medium on which contents information is recorded, 13) an information piece about identification of contents information, and 14) an information piece about accounting.

There are eight encryption-key base information pieces which can be selected to generate an encryption key. Partial bases for an encryption key which are formed by the eight information pieces are also referred to as seeds. Accordingly, there are eight seeds. The eight seeds are serially numbered, and are called a seed "1", a seed "2", a seed "3", a seed "4", a seed "5", a seed "6", a seed "7", and a seed "8". The 8 bits of the encryption control information relate to the eight seeds, respectively. Specifically, each of the 8 bits of the encryption control information which is "1" indicates that the related seed (the information piece corresponding to the related seed) is used as a partial base for an encryption key, while each of the 8 bits which is "0" indicates that the related seed (the information piece corresponding to the related seed) is not used as a partial base for an encryption key.

Figure 10:
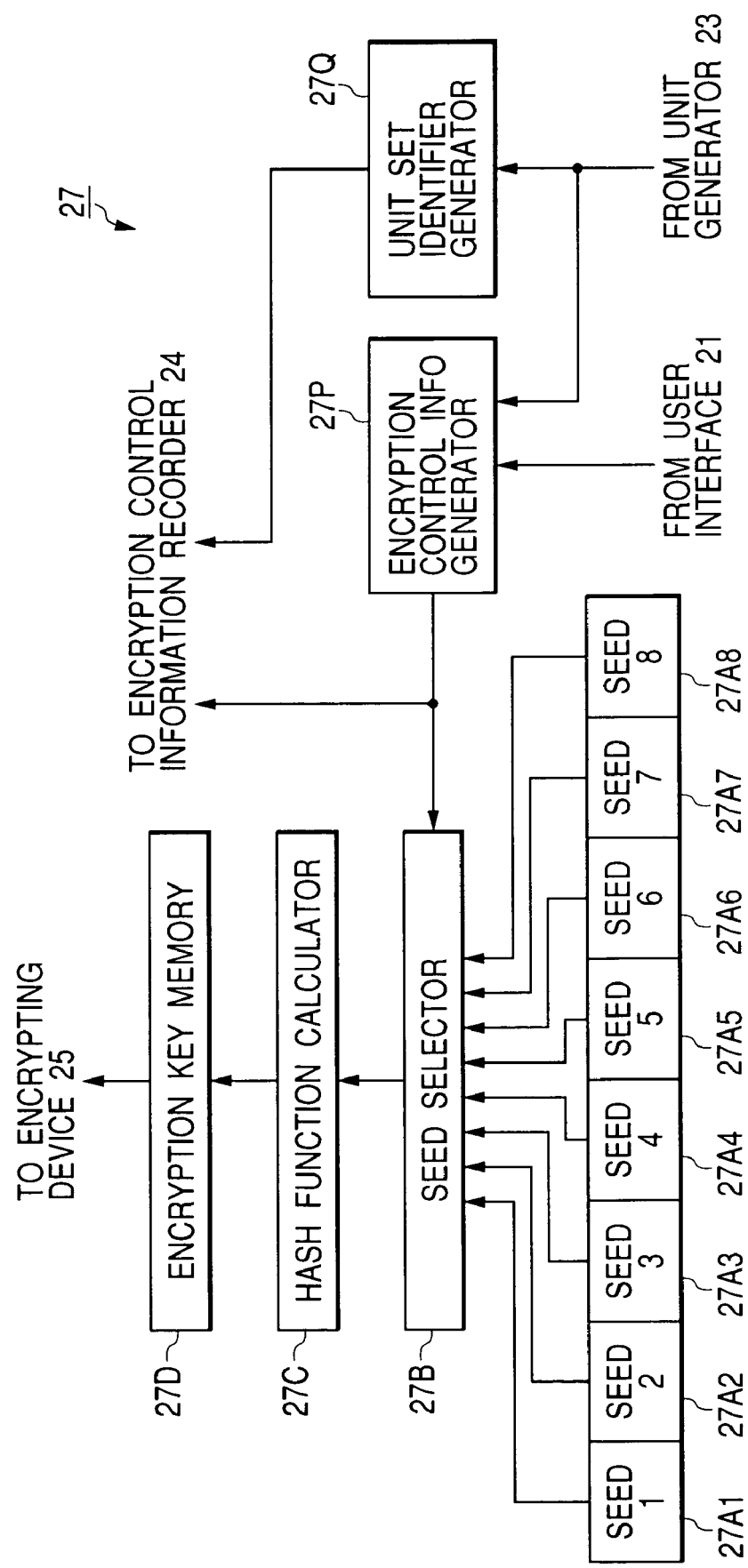
FIG. 10 is a block diagram of a portion of an encryption key generator in FIG. 1.

As shown in FIG. 10, the encryption key generator 27 includes memories 27A1-27A8 storing the encryption-key base information pieces corresponding to the seeds "1"-"8" respectively. Preferably, the CPU 50 (see FIG. 1) loads the memories 27A1-27A8 with the encryption-key base information pieces. The encryption key generator 27 further includes a selector 27B, a calculator 27C, a memory 27D, and signal generators 27P and 27Q. The memories 27A1-27A8 output the encryption-key base information pieces (the seeds "1"-"8") to the selector 27B. The signal generator 27P receives the security-level signal and the unit-timing signal from the user interface 21 and the unit generator 23 (see FIG. 1). The signal generator 27P produces the encryption control information in response to the security-level signal and the unit-timing signal. An example of the signal generator 27P includes a ROM and a counter (for example, a ring counter). The ROM stores different logic states of the encryption control information at different addresses respectively. The counter responds to the unit-timing signal to count pulses therein. The security-level signal and an output signal of the counter are combined into an address signal which designates an address in the ROM which should be accessed. The encryption control information is read out from the accessed address in the ROM. The read-out encryption control information is used as the encryption control information produced by the signal generator 27P. Preferably, the produced encryption control information is varied from TS unit to TS unit. The produced encryption control information may be updated for every prescribed number of TS units. The signal generator 27P outputs the produced encryption control information to the selector 27B and the encryption control information recorder 24 (see FIG. 1). The device 27B selects ones from the encryption-key base information pieces (the seeds "1"-"8") which relate to bits of "1" in the encryption control information, and does not select the other encryption-key base information pieces which relate to bits of "0" in the encryption control information. The device 27B passes the selected encryption-key base information pieces (the selected seeds) to the calculator 27C. The calculator 27C operates the selected encryption-key base information pieces by a predetermined hash function, thereby generating a signal representative of an encryption key. Specifically, the calculator 27C inputs each of the selected encryption-key base information pieces into the hash function. The generated signal representative of the encryption key has a prescribed number of bits. The hash function makes a character sequence correspond to a numerical value. The encryption key is based on one of known cryptosystems. For example, in the case of DES (Data Encryption Standard), the hash function is designed to generate a 56-bit signal representative of an encryption key. The calculator 27C stores the signal of the encryption key into the memory 27D. The memory 27D outputs the signal of the encryption key to the encrypting device 25 (see FIG. 1).

The signal generator 27Q receives the unit-timing signal from the unit generator 23 (see FIG. 1). The signal generator 27Q produces the unit set identifier in response to the unit-timing signal. Specifically, the signal generator 27Q controls the 1-bit segment of the unit set identifier in response to the unit-timing signal. The signal generator 27Q controls the 2-bit segment of the unit set identifier to indicate that a TS unit except its header has not yet been encrypted. The signal generator 27Q outputs the produced unit set identifier to the encryption control information recorder 24 (see FIG. 1). It should be noted that when the encryption of a TS unit is completed, the encrypting device 25 changes the 2-bit segment of a unit set identifier in the TS unit to indicate that the TS unit except its header has been encrypted.

The recording medium 1 which stores contents information and library information provides the following advantages. Recorded data (recorded information) can be reproduced by use of encryption control information. The encryption control information can enhance encryption security. The recording medium 1 can form a high-security prerecorded medium. The recording medium 1 can be used in a contents-information distribution system.

Preferably, the recording medium 1 includes a magnetic disk, a magnetic tape, or an optical disk. The recording medium 1 may include electromagnetic wave or light. Information recorded on the recording medium 1 may include data in an electronic file (in an unrecorded state).

Second Embodiment

A second embodiment of this invention is similar to the first embodiment thereof except for design changes mentioned hereafter. According to the second embodiment of this invention, as shown in FIG. 11, there are four groups "A", "B", "C", and "D" of seeds (information pieces which can be used as partial bases for an encryption key). Encryption control information for identifying encryption-key base information has 4 bits. The 4 bits of the encryption control information relate to the seed groups "A", "B", "C", and "D", respectively. Specifically, each of the 4 bits indicates whether or not the related seed group is used as a partial base for an encryption key. In more detail, each of the 4 bits which is "1" indicates that the related seed group is used as a partial base for an encryption key, while each of the 4 bits which is "0" indicates that the related seed group is not used as a partial base for an encryption key. Since a smaller number of bits compose the encryption control information, a reduction in data amount is provided.

Third Embodiment

A third embodiment of this invention is similar to the second embodiment thereof except for design changes mentioned hereafter. According to the third embodiment of this invention, numbers of "0", "1", "2", and "3" are assigned to four seed groups "A", "B", "C", and "D" respectively. As shown in FIG. 12, encryption control information for identifying encryption-key base information has a 2-bit seed-group identifier which can be changed among "0", "1", "2", and "3". The 2-bit seed-group identifier being "0" designates the seed group "A" as used one. The 2-bit seed-group identifier being "1" designates the seed group "B" as used one. The 2-bit seed-group identifier being "2" designates the seed group "C" as used one. The 2-bit seed-group identifier being "3" designates the seed group "D" as used one. Since a smaller number of bits compose the encryption control information, a reduction in data amount is provided.

Fourth Embodiment

A fourth embodiment of this invention is similar to the first embodiment thereof except for an additional design mentioned hereafter. According to the fourth embodiment of this invention, encryption control information is used as encryption-related parameter information for identifying encryption initial-value information. Encryption of contents information is based on, for example, a CBC mode of DES. Here, CBC is short for "Cipher Block Chaining". The CBC mode of DES causes the encryption to be recursive in a chain on a block-by-block basis. Here, "block" is also referred to as "encryption block". Preferably, a chaining value is defined as follows. A chaining value is varied from block to block. A chaining value for a current block is generated on the basis of encryption-resultant contents information in the immediately-preceding block. Exclusive-OR operation is executed between the chaining value for the current block and contents information in the current block, and the result of Exclusive-OR operation is encrypted to get encryption-resultant contents information for the current block. With respect to a first block, the immediately-preceding block is absent. Accordingly, a chaining value for a first block is normally unavailable. Thus, a chaining value for a first block is fed as an initial value in a suitably way. In other words, a chaining value for a first block is set to an initial value.

Preferably, a chaining value for a first block in every limited block stream portion is set to an initial value. Preferably, a bit indicating whether or not setting should be done is provided in a unit set identifier so that setting can be implemented at a prescribed timing. An initial value for a first block can be utilized in improving cryptosystem security.

Figure 13:
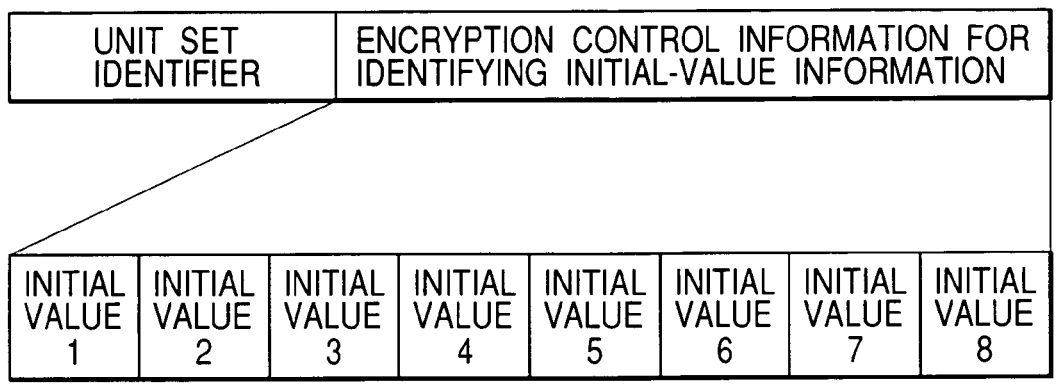
FIG. 13 is a diagram of a unit set identifier, encryption control information, and basic initial values for an encryption block in a fourth embodiment of this invention.

According to the fourth embodiment of this invention, as shown in FIG. 13, there are eight information pieces representing basic initial values respectively. The eight basic initial values are serially numbered, and are called a basic initial value "1", a basic initial value "2", a basic initial value "3", a basic initial value "4", a basic initial value "5", a basic initial value "6", a basic initial value "7", and a basic initial value "8". Encryption control information for identifying encryption basic-initial-value information has 8 bits. The 8 bits of the encryption control information relate to the eight basic initial values "1"-"8", respectively. Specifically, each of the 8 bits of the encryption control information which is "1" indicates that the related basic initial value (the information piece representing the related basic initial value) is used, while each of the 8 bits which is "0" indicates that the related basic initial value (the information piece representing the related basic initial value) is not used.

The eight information pieces representing the basic initial values "1"-"8" are also referred to as the basic-initial-value information pieces. Preferably, the basic-initial-value information pieces are selected from 1) an information piece about an audio-visual program designation number or an audio-visual program identification number, 2) an information piece about a region or regions corresponding to one or more countries, one or more zones, or one or more spaces, 3) an information piece about identification of an individual, 4) an information piece about identification of a group of persons, 5) an information piece about a rating, 6) an information piece about identification of an apparatus maker or a device maker, 7) an information piece about identification of a contents provider, 8) an information piece about time, 9) an information piece about contents authoring persons, 10) an information piece about identification of a reproducing apparatus or a reproducing device, 11) an information piece about identification of a connection apparatus or a connection device, 12) an information piece about identification of a medium on which contents information is recorded, 13) an information piece about identification of contents information, and 14) an information piece about accounting.

Figure 14:
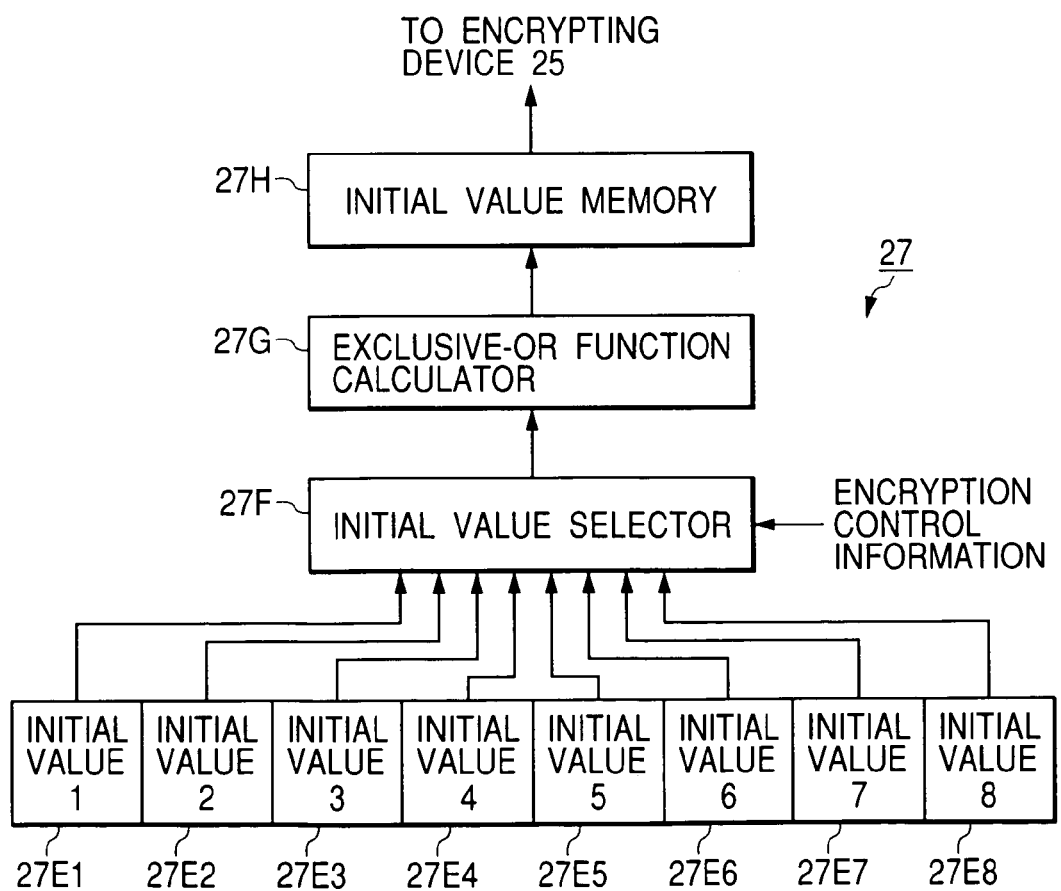
FIG. 14 is a block diagram of a portion of an encryption key generator in the fourth embodiment of this invention.

As shown in FIG. 14, the encryption key generator 27 includes memories 27E1-27E8 storing the information pieces representing the basic initial values "1"-"8" respectively. Preferably, the CPU 50 (see FIG. 1) loads the memories 27E1-27E8 with the information pieces representing the basic initial values "1"-"8". The encryption key generator 27 further includes a selector 27F, a calculator 27G, and a memory 27H. The memories 27E1-27E8 output the basicinitial-value information pieces (the basic initial values "1"-"8") to the selector 27F. The selector 27F receives the encryption control information. The device 27F selects ones from the basic-initial-value information pieces (the basic initial values "1"-"8") which relate to bits of "1" in the encryption control information, and does not select the other basic-initial-value information pieces which relate to bits of "0" in the encryption control information. The device 27F passes the selected basic-initial-value information pieces (the selected basic initial values) to the calculator 27G. The calculator 27G operates the selected basic-initial-value information pieces by a predetermined function, thereby generating a signal representative of an initial value. Specifically, the calculator 27G inputs each of the selected basic-initial-value information pieces into the predetermined function. The generated signal representative of the initial value has a prescribed number of bits. The predetermined function corresponds to Exclusive-OR operation. The initial value is based on one of known cryptosystems. For example, in the case of the CBC mode of DES, the predetermined function and the bit length are designed to generate a 64-bit signal representative of an initial value. The calculator 27G stores the signal of the initial value into the memory 27H. The memory 27H outputs the signal of the initial value to the encrypting device 25 (see FIG. 1).

As previously mentioned, the header of every complete TS unit fed to the encrypting device 25 has a unit set identifier whose 1 bit segment indicates whether or not a chaining value for an encryption block should be set to an initial value. The encrypting device 25 responds to the 1-bit segment of the unit set identifier. When the 1-bit segment of the unit set identifier indicates that a chaining value for an encryption block should be set to an initial value, the encrypting device 25 sets the chaining value to the initial value notified by the encryption key generator 27. Otherwise, the encrypting device 25 does not set the chaining value to the initial value.

The encryption key generator 13 (see FIG. 1) may generate a signal representative of the initial value as the encryption key generator 27 does. In this case, the encryption key generator 13 outputs the signal of the initial value to the decrypting device 14 (see FIG. 1). The decrypting device 14 responds to the 1-bit segment of every unit set identifier in the output signal of the encryption control information reproducer 12 (see FIG. 1). When the 1-bit segment of a unit set identifier indicates that a chaining value for an encryption block should be set to an initial value, the decrypting device 14 uses the initial value notified by the encryption key generator 13 in the decryption of the output signal of the encryption control information reproducer 12.

Fifth Embodiment

Figure 15:
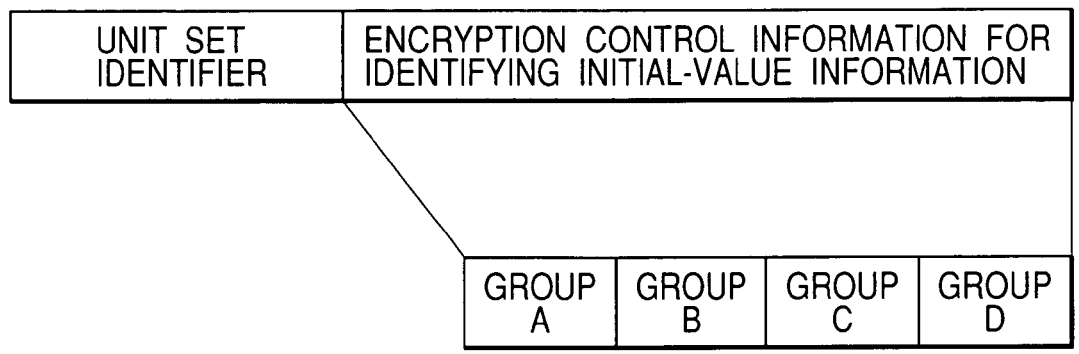
FIG. 15 is a diagram of a unit set identifier, encryption control information, and basic-initial-value groups in a fifth embodiment of this invention.

A fifth embodiment of this invention is similar to the fourth embodiment thereof except for design changes mentioned hereafter. According to the fifth embodiment of this invention, as shown in FIG. 15, there are four groups "A", "B", "C", and "D" of basic initial values (information pieces representing the basic initial values). Encryption control information for identifying encryption basic-initial-value information has 4 bits. The 4 bits of the encryption control information relate to the basic-initial-value groups "A", "B", "C", and "D", respectively. Specifically, each of the 4 bits indicates whether or not the related basic-initial-value group is used. In more detail, each of the 4 bits which is "1" indicates that the related basic-initial-value group is used, while each of the 4 bits which is "0" indicates that the related basic-initial-value group is not used. Since a smaller number of bits compose the encryption control information, a reduction in data amount is provided.

Sixth Embodiment

Figure 16:
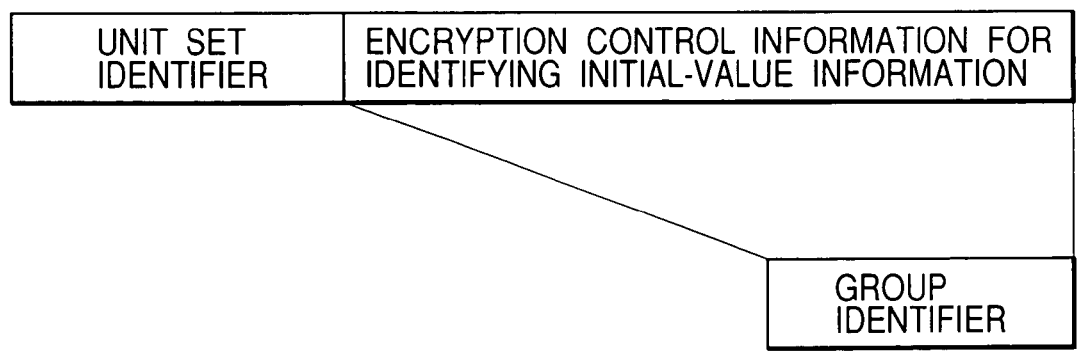
FIG. 16 is a diagram of a unit set identifier, encryption control information, and a group identifier in a sixth embodiment of this invention.

A sixth embodiment of this invention is similar to the fifth embodiment thereof except for design changes mentioned hereafter. According to the sixth embodiment of this invention, numbers of "0", "1", "2", and "3" are assigned to four basic-initial-value groups "A", "B", "C", and "D" respectively. As shown in FIG. 16, encryption control information for identifying encryption basic-initial-value information has a 2-bit group identifier which can be changed among "0", "1", "2", and "3". The 2-bit group identifier being "0" designates the basic-initial-value group "A" as used one. The 2-bit group identifier being "1" designates the basic-initial-value group "B" as used one. The 2-bit group identifier being "2" designates the basic-initial-value group "C" as used one. The 2-bit group identifier being "3" designates the basic-initial-value group "D" as used one. Since a smaller number of bits compose the encryption control information, a reduction in data amount is provided.

Seventh Embodiment

Figure 17:
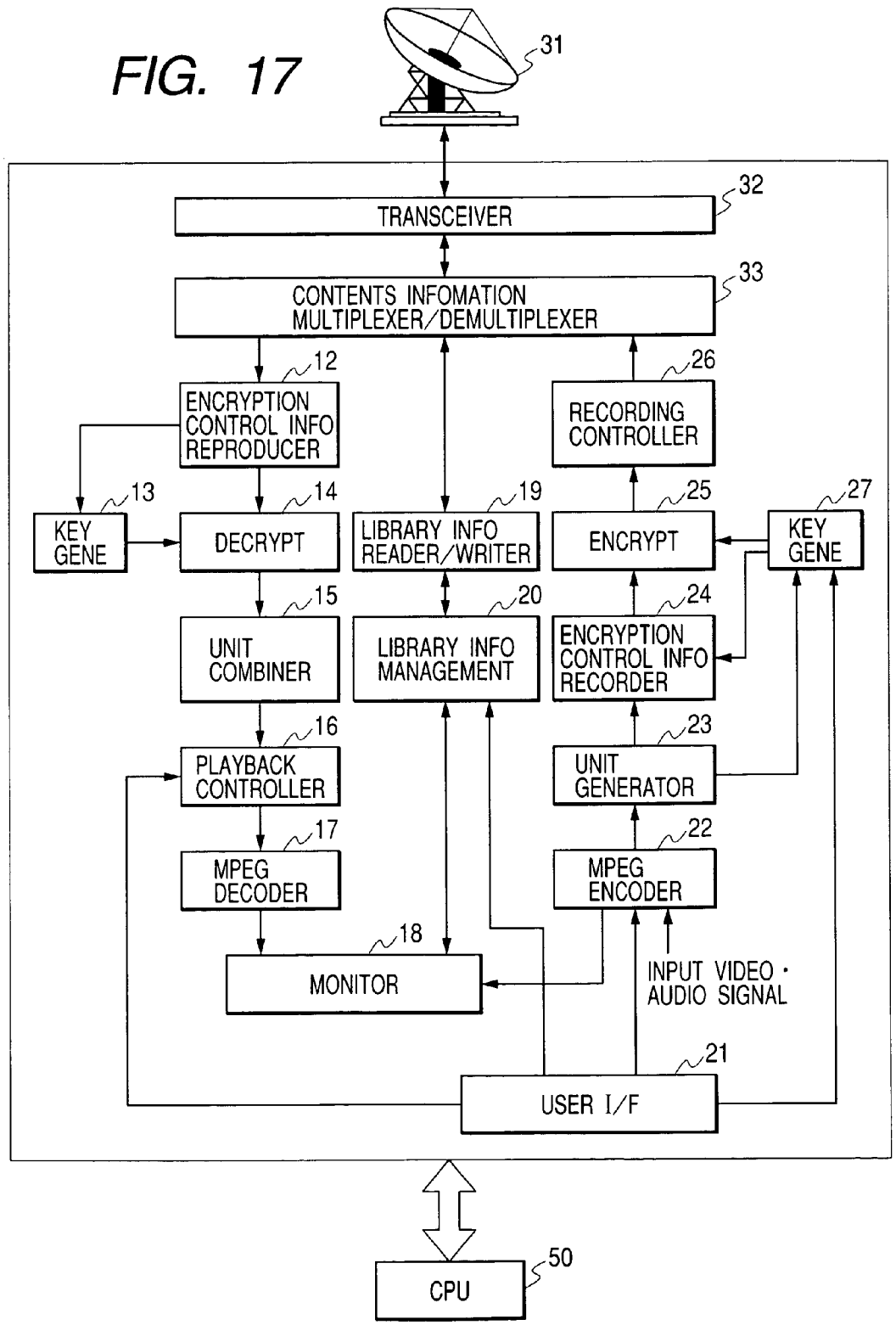
FIG. 17 is a block diagram of an information-communications apparatus according to a seventh embodiment of this invention.

FIG. 17 shows an information-communications apparatus according to a seventh embodiment of this invention. The apparatus of FIG. 17 is similar to the apparatus of FIG. 1 except for design changes mentioned hereafter. The apparatus of FIG. 17 includes a multiplexer/demultiplexer 33 instead of the main reader/writer 11 (see FIG. 1). The apparatus of FIG. 17 includes an antenna 31 and a transceiver 32. The transceiver 32 is connected between the antenna 31 and the multiplexer/demultiplexer 33.

Operation of the apparatus of FIG. 17 can be changed among different modes including a transmission mode and a reception mode.

During the transmission mode of operation, the multiplexer/demultiplexer 33 receives contents information from the recording controller 26. The multiplexer/demultiplexer 33 receives library information from the library information reader/writer 19. The multiplexer/demultiplexer 33 multiplexes the contents information and the library information. The multiplexer/demultiplexer 33 outputs the multiplexing-resultant information to the transceiver 32. The transceiver 32 converts the multiplexing-resultant information into a radio signal. The transceiver 32 feeds the radio signal to the antenna 31. The antenna 31 radiates the radio signal. The transceiver 32 controls the transmission of the contents information.

During the reception mode of operation, the antenna 31 captures a radio signal, and feeds the radio signal to the transceiver 32. The transceiver 32 converts the radio signal into multiplexing-resultant information. The transceiver 32 outputs the multiplexing-resultant information to the multiplexer/demultiplexer 33. The multiplexer/demultiplexer 33 demultiplexes the multiplexing-resultant information into contents information and library information. The multiplexer/demultiplexer 33 outputs the contents information to the encryption control information reproducer 12. The multiplexer/demultiplexer 33 outputs the library information to the library information reader/writer 19. The transceiver 32 controls the reception of the contents information.

Advantages Provided by Embodiments

The first to seventh embodiments of this invention provide advantages indicated below.

Encryption-resultant contents information is divided into units. Every unit holds encryption control information for identifying a plurality of information pieces used as partial bases for an encryption key. In the case where the encryption control information is varied from unit to unit while the partially editing of the contents information can be implemented, the encryption key can easily be changed and the security can be enhanced.

Encryption-resultant contents information is divided into units. Every unit holds encryption control information for identifying a plurality of information pieces used as partial bases for an encryption key. For every unit, encryption control information is reproduced, and information pieces (encryption-key base information pieces) used as partial bases for an encryption key are identified in response to the reproduced encryption control information. For every unit, the encryption key is generated from the identified encryption-key base information pieces, and encryption-resultant contents information is decrypted into original contents information in response to the generated encryption key. Therefore, even in the case where the encryption key is varied from unit to unit, the encryption-resultant contents information can be correctly decrypted.

The recording medium 1 stores encryption-resultant contents information which is divided into units. Every unit holds encryption control information for identifying a plurality of information pieces used as partial bases for an encryption key. In the case where the encryption control information is varied from unit to unit, even when the encryption-resultant contents information is illegally copied from the recording medium 1, it is difficult to reproduce original contents information from the illegal copy. Therefore, the security can be enhanced.

What is claimed is:

1. A method of encrypting plain text information with an encryption key, the plain text information including digital contents, the method comprising the steps of:
   dividing the plain text information into units each corresponding to every prescribed number of successive packets conforming to the MPEG standards;
   generating an encryption key from information pieces appointed for each of the units composing the plain text information;
   encrypting each of the units composing the plain text information in response to the corresponding generated encryption key to generate a unit of encryption-resultant information;
   generating encryption control information for appointing the information pieces used in generating the encryption key for each of the units composing the plain text information; and
   adding, to each of the units of the encryption-resultant information, the corresponding generated encryption control information.

2. An apparatus for encrypting plain text information with an encryption key, the plain text information including digital contents, the apparatus comprising:
   means for dividing the plain text information into units each corresponding to every prescribed number of successive packets conforming to the MPEG standards;
   means for generating an encryption key from information pieces appointed for each of the units composing the plain text information;
   means for encrypting each of the units composing the plain text information in response to the corresponding generated encryption key to generate a unit of encryption-resultant information;
   means for generating encryption control information for appointing the information pieces used in generating the encryption key for each of the units composing the plain text information; and
   means for adding, to each of the units of the encryption-resultant information, the corresponding generated encryption control information.

* * * * *